Aug. 8, 1961   B. KAZAN   2,995,741
DISPLAY
Filed March 28, 1956   3 Sheets-Sheet 1

INVENTOR.
BENJAMIN KAZAN
BY
ATTORNEY

Aug. 8, 1961        B. KAZAN        2,995,741
DISPLAY
Filed March 28, 1956        3 Sheets-Sheet 2
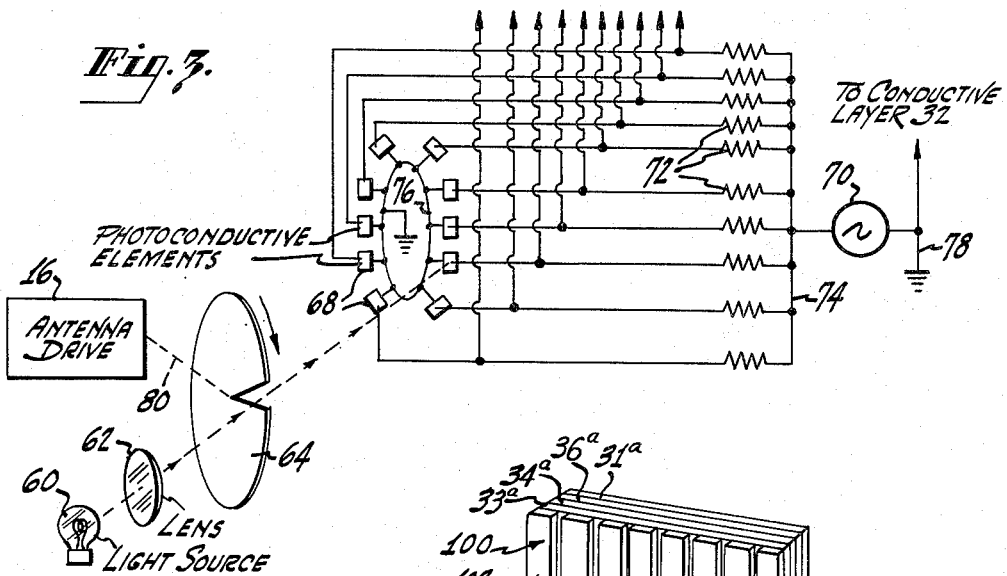
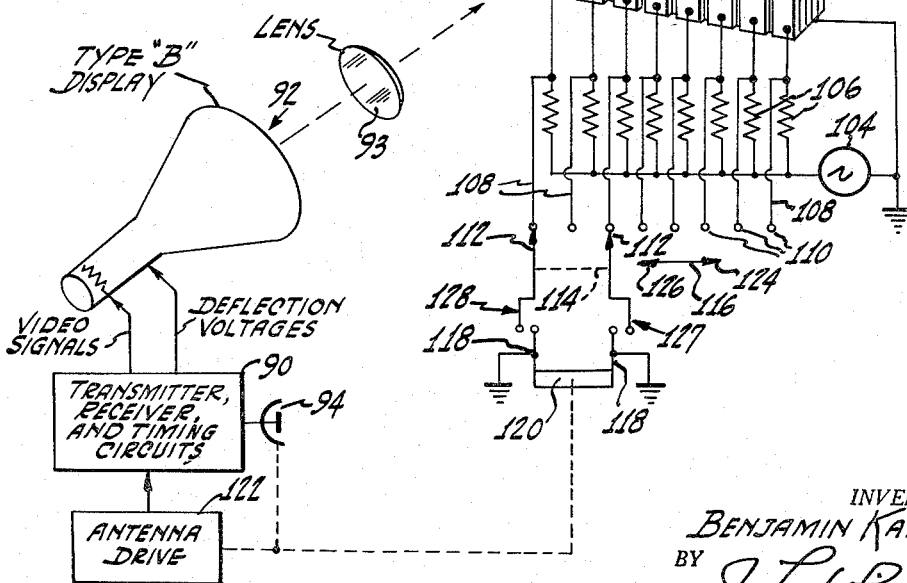
INVENTOR.
BENJAMIN KAZAN Aug. 8, 1961    B. KAZAN    2,995,741
DISPLAY
Filed March 28, 1956    3 Sheets-Sheet 3

INVENTOR.
BENJAMIN KAZAN
BY
ATTORNEY

United States Patent Office 2,995,741
Patented Aug. 8, 1961

2,995,741
DISPLAY
Benjamin Kazan, Princeton, N.J., assignor to Radio Corporation of America, a corporation of Delaware
Filed Mar. 28, 1956, Ser. No. 574,447
18 Claims. (Cl. 343—10)

The present invention relates to light amplifiers and particularly to improved means for erasing a portion of the image on an amplifier. The invention is particularly useful in connection with area display type radar systems although it is not restricted to this use.

In general, a storage light amplifier panel can be made using electroluminescent and photoconductive elements which operate with light feedback. The individual storage elements of such a panel are stable, either in the "off" position or the "on" position. In other words, when an image is projected onto the image receiving portion of the light amplifier, an image appears and remains on the image reproducing portion thereof. The image can be removed or erased by disconnecting the supply voltage which energizes the light amplifier. For example, if a light amplifier is employed to intensify the image of an area type radar display, the entire image on the light amplifier can be erased periodically by removal of the amplifier supply voltage. However, several seconds or more may be necessary for scanning out the new picture, and the observer would be required to wait almost this entire interval, after an amplifier is erased, to see the complete cycle of information again written on the screen.

An object of the present invention is to provide a display system of the type described above in which data is substantially continuously presented.

A more general object of the invention is to provide an improved light amplifier means in which selected portions of the reproduced image may be erased at will.

Yet another object of the invention is to provide an improved display system for an area type radar system.

According to one aspect of this invention, the image receiving portion of a light amplifier receives a radiant energy writing line which, as it moves along a coordinate on the image receiving portion perpendicular to the line, produces an intensified picture on the image reproducing portion of the light amplifier. The light amplifier is one of the type in which the image, after being written, remains "on." For example, the amplifier may be one of the regenerative type—known also as a "storage" type amplifier. Means are provided, synchronized with the movement of the writing line, for erasing a discrete portion of the image on the amplifier immediately in front of and along the entire extent of the intensified image of the writing line. In one form of the invention, means are provided responsive to the direction of movement of the writing line for causing the erased portion always to precede the writing line, regardless of the latter's direction of movement.

According to another aspect of the invention, one of the two conductive layers of a light amplifier is divided into a plurality of discrete sections which are insulated from one another. All of the sections except the one or ones it is desired to erase are connected to one terminal of a source of supply energy and the other conductive layer to the other terminal of the source.

A specific form of the invention is one in which one of the conductive layers is formed into spaced, discrete, conductive sections which are insulated from one another and extend radially from the center toward the edges of the layer. Each such section is a relatively small fraction of the entire layer area. This light amplifier is used in a radar system employing a so-called P.P.I. (Planned position indication) type display. The one of the sectors which is erased (the one selectively disconnected from the source of supply energy) is the one which immediately precedes the line (the line due to the swept electron beam of the P.P.I. indicator) being written. The erasing mechanism may include a rotatable, disc-shaped conductive member with a small sector thereof cut out. This member is connected to one terminal of an alternating current source and selectively to all of the layer sections except one. The other terminal of the source is connected to the other conductive layer. The member acts as a rotating switch and it disconnects successive ones of the sections from the source. The member is driven in synchronism with the rotating trace on the screen of the P.P.I. indicator, as by mechanically coupling it to the rotating antenna of the radar system.

Other embodiments of the invention are useful in connection with television displays and still others with various types of sector scanning radar systems. These will be described more fully below.

The invention will be described in greater detail by reference to the following description taken in connection with the accompanying drawing in which:

FIGURE 3 is a schematic drawing of an electronic switching arrangement which is useful in connection with a modified form of the arrangement of FIGURE 1;

FIGURE 4 is a diagram partially in block, and partially in schematic form of another form of the present invention;

FIGURE 6b is a sketch of the screen of a cathode ray tube display device which could be used with the amplifier of FIGURE 6a.

Throughout the drawings, similar reference numerals are applied to similar elements.

Figure 1:
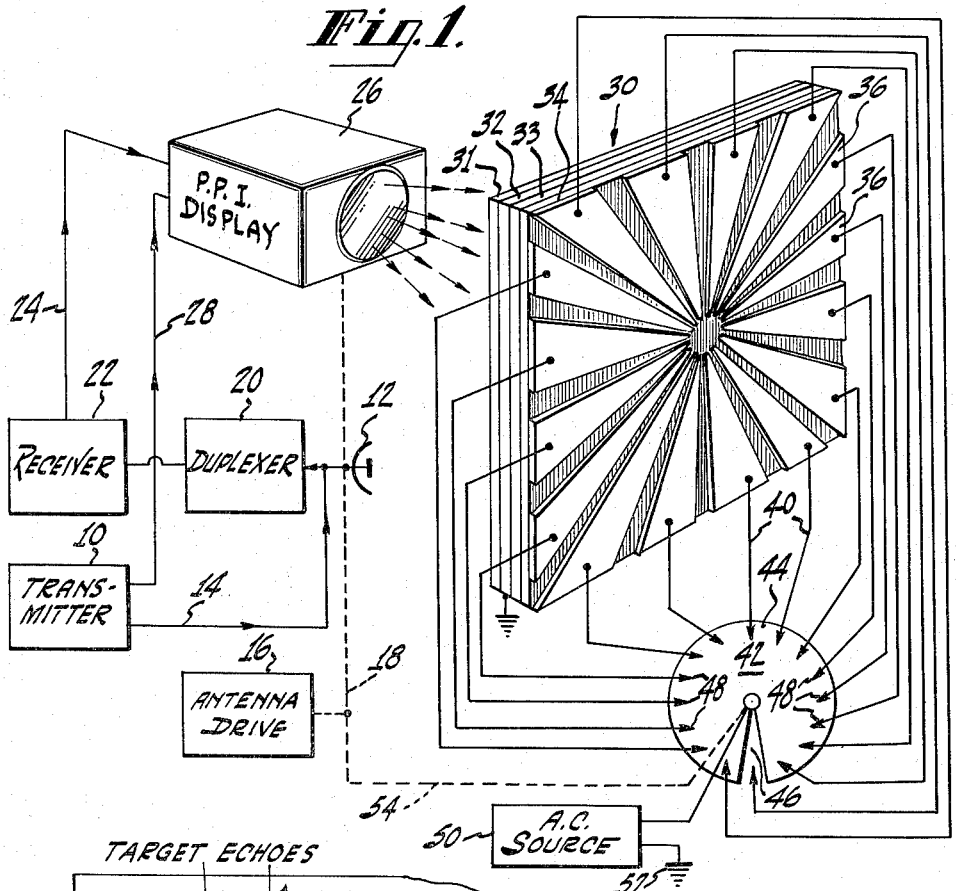
FIGURE 1 is a diagram, partially in block and partially in schematic form of a specific form of the present invention.

Referring to FIGURE 1, transmitter 10, which may be a pulse-type, radio-wave transmitter, supplies a radio frequency wave to directive antenna 12 via line 14. Antenna 12 may include a parabolic dish or cylinder, broadside array or other similar highly directive, wave-radiating means. The antenna is continuously driven in azimuth by an antenna drive 16 which, for example, may be an electric motor and gear assembly. The mechanical connection from drive 16 to the antenna is indicated by dashed line 18. Waves radiated from antenna 12 may strike wave reflecting objects such as aircraft, surface vessels, prominent ground targets or the like, and a portion of such energy reflected back to the antenna. The reflected waves are normally termed "echoes." These pass from the antenna, through a duplexer 20, which may consist of a gas-filled transmit-receive device, to receiver 22. The echoes are detected and demodulated in the receiver and the resultant video signals are applied over lead 24 to P.P.I. display 26. The latter includes a cathode ray tube indicator and time base circuits. The time base circuits produce sawtooth waves which are applied to the deflecting means of the indicator for sweeping the electron beam of the indicator along one coordinate of the screen of the indicator. The sawtooth waves may be synchronized with the transmitted waves by timing pulses from the transmitter supplied to the indicator by a lead 28. The swept electron beam, which normally originates at the center of the indicator screen, is rotated in synchronism with the azimuthal rotation of the antenna 12. This may be accomplished, for example, by mechanically connecting a rotatable deflection coil of the indicator to the antenna either directly or by means of a servo arrangement.

The foregoing discussion of a P.P.I. radar system is brief and not meant to cover all components of the system in detail. The system, per se, is well known in the art.

P.P.I display 26 is a so-called projection type display. It includes means such as mirrors and/or lenses for projecting the image on the screen of the indicator onto another, larger screen. In conventional projection type P.P.I. radar systems, the other screen may be a translucent plate of ground glass. According to the present invention, however, the screen consists of a light amplifier 30.

Light amplifier 30 is a laminated structure. The first layer is a glass plate 31 which is transparent to light. The second layer 32 is a radiant energy permeable layer of conductive material. In the present instance, layer 32 is transparent to light. The third layer 33 is one of a material whose impedance is subject to change in response to radiant energy excitation. This layer is generally formed of a photoconductive material such as suitably activated cadmium sulfide or cadmium selenide. Layer 34 is formed of a material of the type which emits light in response to an electric field applied across the layer. This layer is generally termed an electroluminescent layer and may be formed of a phosphor such as copper activated zinc sulfide, zinc selenide activated by copper, or the like. The phosphor is embedded in an appropriate light permeable dielectric material such as plastic, like ethyl cellulose or polystyrene, lacquer, wax, or one of a number of different types of matrix material.

The light amplifier, as described so far, is already known in the art. While, in the present instance, layer 34 emits visible light, it is to be understood that in the more general case the same may emit infra-red, ultraviolet or other forms of radiant energy. By the same token, although in the present instance layer 32 has an impedance which is a function of the amplitude of the light excitation, the layer may also be responsive to ultraviolet rays, infra-red rays, X-rays and other types of radiation.

The final layer of the laminated structure, unlike the other layers, is formed of a plurality of discrete sections 36 which are spaced and insulated from one another. The sections, in the specific form of the invention illustrated in FIGURE 1, are generally triangularly shaped and extend radially from the center portion of the last layer to the edge portion thereof. Sections 36, are light permeable and are formed of conductive material such as tin oxide or a thin evaporated layer of silver or gold. Each section is a relatively small fraction of the entire area of the final layer. The spacings between the different sections are relatively small. They are shown enlarged for the purpose of drawing simplicity. When a source of supply energy, such as a source of alternating voltage is connected across one of the sections 36 and conductive layer 32, the light amplifier is in operating condition. Thus, an image projected onto the image receiving portion of the amplifier (plate 31) will appear intensified on the image reproducing portion of the amplifier (sections 36). Due to internal light feedback from the electroluminescent layer 34 to the photoconductive layer 32, the image remains "on" even after the projected image is removed from the image receiving portion of the amplifier so long as there is an electric field across layers 33 and 34.

According to the present invention, a separate lead 40 is connected to each section 36 of the final layer of the light amplifier. The leads extend to a rotating switch assembly 42. The assembly includes a disc-shaped conductive plate 44 with a narrow sector 46 thereof cut out. The leads are connected to brushes 48 which are engageable with the peripheral edge of the disc 44. One terminal of an A.C. source 50 remains connected to the disc 44 as the latter rotates. The other terminal, a ground connection, is permanently electrically connected to conductive layer 32. The disc is mechanically connected via lead 54 to the antenna drive mechanism 16, whereby the motor which drives the antenna also rotates the disc. The disc is so phased with respect to the antenna that source 50 is successively disconnected from the ones of sectors 36 immediately preceding the rotating radar writing trace. This disconnection erases or blanks the portion of the laminated structure which is adjacent to the disconnected sector or sectors, that is, it erases any image on the portion which includes the disconnected sector or sectors as one of the layers of the laminated structure. Thus a relatively small fraction of the image in front of the radar scanning line is erased as the system operates.

Figure 2:
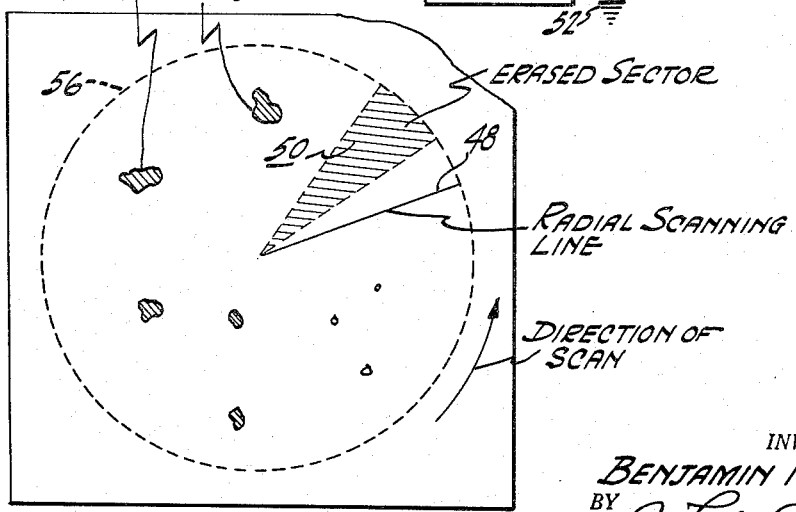
FIGURE 2 is a sketch of a display produced with the form of the invention shown in FIGURE 1.

FIGURE 2 illustrates the resultant display. The spaces between sections 36 are relatively small, hardly visible, and are not shown on FIGURE 2. Circle 56 is merely an outline of the cathode ray tube indicator screen and does not appear on the light amplifier. The writing beam is shown as a single line 48. The sector erased is shown as the dashed sector 50 which immediately precedes the scanning line.

Light amplifier 30 is shown in FIGURE 1 as having a continuous photoconductive layer and a continuous electroluminescent layer. However, in preferred forms of the invention one or both of the layers may be divided into minute storage elements to prevent spreading of the stored picture and to enhance the feedback. For example, the photoconductive layer may consist of an opaque, perforated sheet formed of an insulated material such as polystyrene. This layer may be made opaque as by dyeing or by coating with an opaque insulating material such as a black lacquer. The perforations in the sheet may then be filled with cadmium sulfide or the like. The photoconductive material filling the perforations should be thick enough to make good electrical contact with both the electroluminescent layer 34 and the conductive layer 32.

The type of layer construction described above is applicable to all of the embodiments of the invention to be described below. The expression, in the claims, "a layer of material the impedance of which is subject to change in response to radiant energy excitation" is meant to cover both the case of a continuous layer of such material and one which is divided into relatively small discrete elements to prevent spreading the stored picture, as described above. By the same token, the expression, in the claims, "a layer of material of the type which emits light in response to an electric field applied across said layer" is meant to cover both the continuous layer and the one formed into discrete elements of minute size.

In the embodiment of FIGURE 1, the light permeable conductive layer is shown formed into discrete sections and the radiant energy permeable layer 32 is shown as a continuous layer. This invention is equally applicable to the case where the light permeable layer is continuous and the radial energy permeable layer 32 is formed into discrete sections. In this latter case, the plurality of leads 40 would go to the individual sections of conductive layer 32 and the ground lead 52 would be connected to the light permeable layer. This analysis applied equally as well to the other embodiments of the invention to be described later.

The various layers making up the laminated structure of the embodiment shown in FIGURE 1 and the others to be described later are now relatively well known to those skilled in the art. However, for the sake of completeness, they will be described in brief here. Layer 31 may be a radiant energy permeable material such as pyrex glass about a quarter of an inch thick. Conductive layers 32 and 36 may include tin oxide or other metallic compounds. They may be formed, for example, by exposing the heated backing material (glass, for example) to vapors of silicon chloride, tin chloride or titanium chlorides, and then placing the heated coated backing material in a slightly reducing atmosphere. The resulting layer appears to contain the metal oxide (silicic, stannic, or titanic), probably to some extent, at least, reduced to a form lower than the dioxide, although the exact composition is not fully known. The photoconductive and electroluminescent layers have already been described in brief. The first-mentioned layer may be about 1 mil thick and the other about 10 mils thick.

In the embodiment of the invention shown in FIGURE 1, sections 36 are spaced from one another. Although this is not particularly troublesome, a small amount of the picture area (the portion between sections) cannot be energized or erased. Therefore, this space should be made as small as possible.

A number of different methods may be used to form the spaced insulated sections. In one, a suitably cut-out mask or template may be placed on the backing layer (electroluminescent layer 34 in the embodiment of FIGURE 1) and the conductive material then sprayed or evaporated onto the backing layer. The mask shields the spaces between sectors and prevents them from becoming coated. Another method is first to form a continuous conductive layer on the backing layer and then to machine grooves between sections.

An alternative switching arrangement for the embodiment of the invention shown in FIGURE 1 is illustrated in FIGURE 3. It includes a source of light 60, a focusing system for collimating the light shown as a lens 62, a rotatable, opaque disc 64 formed with a cut out sector 66, and a plurality of photoconductive elements 68. The sectors 36 of the light permeable layer are connected to one terminal of an alternating current source 70 through a plurality of resistors 72, respectively. One end of each resistor is connected to a common bus 74 connected to the aforementioned terminal of source 70. The other ends of the resistors 72 are connected to different ones of the photoconductive elements 68. The photoconductive elements in turn are connected to a common bus 76 which is electrically connected to the other terminal 78 (ground) of the alternating current source. The photoconductive elements normally present a high impedance to alternating current flow and therefore normally do not affect the potential difference between sectors 36 and layer 32. However, when a photoconductive element is illuminated by a source of light, its impedance is sharply reduced and the one of sectors 36 to which it is connected is placed substantially at ground potential. Thus, the electric field between that sector and conductive layer 32 is removed and the image adjacent that sector is erased.

Disc 64, which may be thought of as a shutter, is connected to the antenna drive 16 either via a mechanical connection 80 or by means of a servo system driven from the antenna or the antenna drive. Thus, the shutter rotates in synchronism with the antenna rotation and causes the light from source 60 to be focused onto successive ones of the photoconductive element, in sequence. As in the embodiment of FIGURE 1, disc 34 is so phased relative to the antenna that a small portion of the picture immediately in front of the entire length of the writing beam is continuously erased as the writing beam rotates.

An alternative electronic switching arrangement is possible. Here, the photoconductive elements 68 (FIGURE 3) are placed in series between sectors 36 and source 70 and resistors 72 are omitted. The shutter consists of a narrow sector rather than a disc with a cut out section. All of the photoconductive elements except one are normally illuminated. The one not illuminated acts as a high impedance and the sector connected to it is therefore not energized, and its picture, if any, erased. As in the case of the embodiment of FIGURE 3, the shutter is so phased relative to the antenna that a small portion of the picture immediately in front of the entire length of the writing beam is continuously erased as the writing beam rotates.

The principles of the present invention are applicable to types of radar displays other than P.P.I. displays. For example, the invention, in somewhat modified form, may be used in connection with a type B display as is illustrated in FIGURE 4. The radar system, which per se is well known, is illustrated in block and schematic form. It includes a transmitter, a receiver, and timing circuits as indicated generally by block 90, and a cathode ray tube indicator as indicated generally by tube 92. The image projecting system is indicated schematically by lens 93. Directive antenna 94, which is coupled to the receiver and transmitter, is driven back and forth through an azimuthal angle of restricted size, and the writing beam of the indicator moves in synchronism with the antenna. Since the writing beam moves first in one direction and then in the other, the sector on the light amplifier which must be erased is first on one side of the scanning line and then on the other side of the scanning line. This requires a somewhat different type of switching arrangement than the one shown in FIGURE 1 or 4 and also a different light amplifier configuration.

Figure 5A:
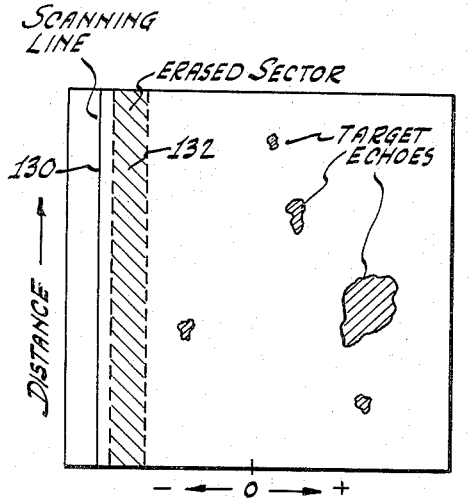
FIGURES 5a and 5b are sketches of images reproduced on a light amplifier shown in FIGURE 4.
Figure 5B:
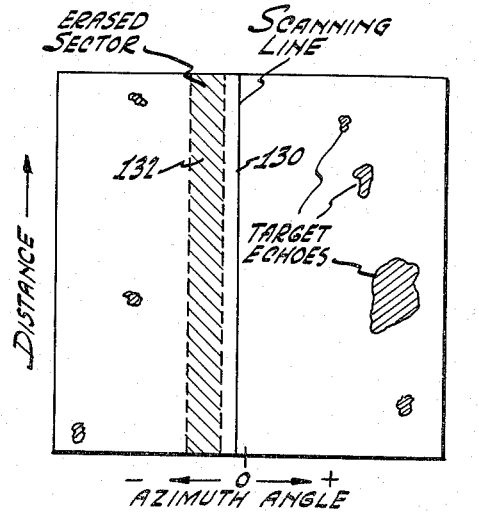

Still referring to FIGURE 4, light amplifier 30a includes a glass plate 31a, a light-permeable, conductive layer 36a, a layer of material 34a of the type which emits light in response to an electric field applied across the layer, and a layer of material 33a the impedance of which is subject to change in response to radiant energy excitation. The final layer 100 consists of a plurality of rectangularly shaped, spaced, conductive sectors 102 which are insulated from one another. Eight such sections are shown in FIGURE 5, however, it will be appreciated that the layer may consist of a hundred or more such sections. The sections may be separated from one another similarly to those of the amplifier shown in FIGURE 1. In the arrangement of FIGURE 4, the conductive layer closest to the image source 92 is formed into sections rather than the one closest to the image reproducing source of the light amplifier as is shown in FIGURE 1. Both constructions are possible.

The means for energizing the light amplifier includes a source of alternating voltage 104 one terminal of which is connected to conductive layer 36a and the other terminal of which is connected through resistors 106 to the respective sectors. The sections are also connected via leads 108 to a plurality of terminals 110. Two brush members 112 which are permanently connected by an insulating bar 114 contact certain ones of the terminals. The brushes are movable in the direction indicated by arrows 116 and engageable with different ones of terminals 110. The means for moving the brushes along the terminals include a pair of contact bars 118 which are permanently connected together by an insulating bar 120 and which are driven in synchronism with the antenna by antenna drive 122.

In operation, when the antenna scans in one direction, contact bars 118 are moved in the direction indicated by arrowhead 124, and when the antenna scans in the opposite direction, contact bars 118 are moved in the direction indicated by arrowhead 126. When moving in the direction of arrowhead 124, switch 127 is closed and switch 128 remains open, and when moving in the direction of arrowhead 126, switch 127 is open and switch 128 closed. When either one of the switches is closed, the section 102 connected to that switch is effectively grounded, whereby the electric field is removed from across the layer of electric field sensitive material 34a and the image is erased from the corresponding area of the image reproducing portion of the amplifier. The antenna is so synchronized with the switching arrangement that the erased sector always precedes the scanning line by a relatively small amount of space.

The type of operation described above, can be seen somewhat more clearly in FIGURES 5a and 5b. Both figures show the image reproducing portion of the amplifier. The spaces between sections are relatively small.

Figure 6A:
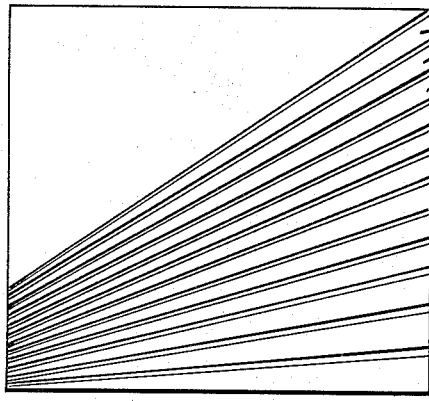
FIGURE 6a is a plan view of a modified form of light amplifier.
Figure 6B:
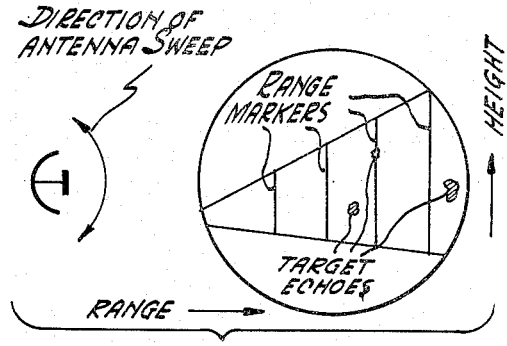

The scanning line is indicated by solid line 130 and target echoes are shown as intensified marks. When the direction of movement of the scanning line is to the right, as shown in FIGURE 6a, the erased sector 132 appears slightly to the right of the scanning line; when the scanning line moves to the left, the erased sector 136 appears to the left of the scanning line as shown in FIGURE 6b. The change in position of the erased sector from one side of the scanning line to the other side of the scanning line, when the direction of antenna movement is reversed, is accomplished by the switching arrangement already explained in detail in connection with FIGURE 4.

The arrangement of FIGURE 4 is also applicable to the large screen projection of television images. As in the case of the arrangement of FIGURE 4, the spaced sections of one of the conductive layers are long, narrow strips which are parallel to one another. However, since a television system is scanned in a horizontal direction, the strips on the light amplifier would also be horizontal. When used in connection with a television system, each strip should be relatively narrow—on the order of several scanning lines or less. The switching arrangement can be similar to the ones shown in FIGURES 1 or 3 since the swept electron beam always moves in one direction while writing, that is, from the top of the screen to the bottom of the screen. An important advantage of using an arrangement of this type is that the frame speed can be substantially reduced without the introduction of any flicker. This is so because the image, once painted on the light amplifier, persists on the amplifier without substantial decay until it is erased immediately ahead of the next written line. Lower frame speed enables one substantially to reduce the bandwidth requirements of the television system.

FIGURES 6a and 6b illustrate, in brief, one other use of the invention. This is in connection with a sector display radar system the display of which appears as the one shown in FIGURE 6b. Here, range is indicated along a horizontal coordinate and height along a vertical coordinate. The sections 140 of the conductive layers then appear as shown in FIGURE 6a. The remaining layers of the light amplifier are as described in connection with the other embodiments of the invention.

What is claimed is:

1. In combination, a laminated structure comprising a radiant energy permeable layer of conductive material; a first layer of material the impedance of which is subject to change in response to radiant energy excitation; a second layer of material of the type which emits light in response to an electric field applied across said second layer; a light permeable layer of conductive material, one of said layers of conductive material being continuous and the other comprising spaced, discrete, conductive sections which are insulated from one another, said four layers being formed into a laminated structure with layers occurring in the order named; a first lead connected to said continuous layer of conductive material; a plurality of other leads, one connected to each said conductive sections; a pair of connections for a source of electric energy of the type which, when connected across at least one of said conductive sections and said continuous layer of conductive material produces an electric field through a portion of the light emitting layer; and means for connecting said first lead to one of said connections, and all of said plurality of other leads, except the one or ones leading to the sections adjacent to the portion of the laminated structure which it is desired to blank, to the other of said connections.

2. In combination, a laminated structure comprising a radiant energy permeable, continuous layer of conductive material; a layer of material the impedance of which is subject to change in response to radiant energy excitation; a layer of material of the type which emits light in response to an electric field applied across said layer; a light permeable layer of conductive material comprising spaced, discrete, conductive sections which are insulated from one another and extend radially from the center toward the edges of said layer, said four layers being formed into a laminated structure with layers occurring in the order named; a first lead connected to said radiant energy permeable layer; a plurality of other leads, one connected to each said conductive section; a pair of connections for a source of electric energy of the type which, when connected across one of said conductive sections and said radiant energy conductive layer produces an electric field through a portion of the light emitting layer; and means for connecting said first lead to one of said connections, and all of said plurality of other leads, except the one leading to the section adjacent to the portion of the laminated structure which it is desired to blank, to the other of said connections.

3. In combination, a laminated structure comprising a radiant energy permeable layer of conductive material; a layer of material the impedance of which is subject to change in response to radiant energy excitation; a layer of material of the type which emits light in response to an electric field applied across said layer; a light permeable layer of conductive material, one of said layers of conductive material being continuous and the other comprising spaced, discrete, conductive sections which are insulated from one another and extend radially from the center of said screen, said four layers being formed into a laminated structure with layers occurring in the order named; a first lead connected to said continuous layer of conductive material; a plurality of other leads, one connected to each said conductive section; a pair of connections for a source of electric energy of the type which, when connected across one of said conductive sections and said continuous layer of conductive material produces an electric field through a portion of the light emitting layer; means for connecting said first lead to one of said connections; and means for connecting all of said plurality of other leads, except the one leading to the section adjacent to the portion of the laminated structure which it is desired to blank, to the other of said connections, and for successively changing the lead disconnected from said other connection so as to sequentially blank said portions.

4. In the combination as set forth in claim 3, said last-named means comprising a rotatable annular conductive member formed with a cut out portion of restricted size along the periphery thereof; and a plurality of brushes, one connected to each of said plurality of leads, said brushes being engageable with said conductive member at spaced points along the peripheral portion thereof.

5. In combination, a radiant energy permeable, continuous layer of conductive material; a layer of material the impedance of which is subject to change in response to radiant energy excitation; a layer of material of the type which emits light in response to an electric field applied across said layer; a light permeable layer of conductive material comprising generally triangularly shaped, spaced, discrete, conductive sections which are insulated from one another and extend radially from the center to the edges of said layer, said four layers being formed into a laminated structure with layers occurring in the order named; a first lead connected to said radiant energy permeable layer; a plurality of other leads, one connected to each said conductive section; a pair of connections for a source of electric energy of the type which, when connected across one of said conductive sections and said radiant energy conductive layer produces an electric field through a portion of the light emitting layer; and means for connecting said first lead to one of said connections, and all of said plurality of other leads, except the one leading to the section adjacent to the portion of the laminated structure which it is desired to blank, to the other of said connections.

6. In combination, a radiant energy permeable layer of conductive material; a layer of material the impedance of which is subject to change in response to radiant energy excitation; a layer of material of the type which emits light in response to an electric field applied across said layer; and a light permeable layer of conductive material, one of said layers of conductive material being continuous and the other comprising spaced, discrete, conductive sections which are insulated from one another and which extend radially from the center toward the outer edge of said layer, said four layers being formed into a laminated structure with layers occurring in the order named.

7. A radar system comprising, in combination, radio wave transmitting and receiving means including rotatable, directive antenna means and cathode ray tube display means; means for periodically sweeping the electron beam of said display means along one coordinate of the screen thereof in synchronism with the transmission of said radio waves; means for deflecting the swept electron beam along another coordinate of said screen in synchronism with the movement of said antenna means; a regenerative type light amplifier having an image receiving portion and an image reproducing portion; means for projecting an image on the screen of said display means onto the image receiving portion of said light amplifier, whereby, when the light amplifier is operating, an image projected onto the image receiving portion thereof is amplified thereby, and a continuous image tends to remain on the image reproducing portion thereof; and means coupled to said antenna means and to said light amplifier means for erasing a discrete portion of the image on said light amplifier means immediately in front of the intensified image of the swept electron beam, said discrete portion being a fraction of the entire area of the image reproducing portion of said light amplifier means.

8. A radar system as set forth in claim 7, including means for scanning the beam radiated by said antenna means back and forth through a sector in space.

9. A radar system as set forth in claim 7, wherein said light amplifier comprises a laminated structure having at least four layers which occur in the order named, a light permeable layer of conductive material, a layer of material the impedance of which is subject to change in response to light excitation, a layer of material of the type which emits light in response to an electric field applied across said layer, and a light permeable layer of conductive material, one of said layers of conductive material, one of said layers of conductive material comprising spaced, discrete conductive sections which are insulated from one another.

10. A radar system comprising, in combination, radio wave pulse transmitting and receiving means including rotatable, directive antenna means for radiating and receiving said waves, and cathode ray tube display means for displaying waves received from wave reflecting objects; means for periodically sweeping the electron beam of said display means along a linear coordinate of the screen thereof in synchronism with the transmission of said radar waves; means for deflecting the swept electron beam along a circular coordinate of said screen in synchronism with the rotation of said antenna means; a regenerative type light amplifier having an image receiving portion and an image reproducing portion; means for projecting an image on the screen of said display means onto the image receiving portion of said light amplifier, whereby, when the light amplifier is operating, an image projected onto the image receiving portion thereof is amplified thereby, and a continuous image tends to remain on the image reproducing portion thereof; and means coupled to said antenna means and to said light amplifier means for erasing a discrete portion of the image on said light amplifier means immediately in front of and along the enitre extent of the intensified image of the swept electron beam, said discrete portion being a relatively small fraction of the entire area of the image reproducing portion of said light amplifier means.

11. In combination, a cathode ray tube indicator having a screen on which an image may be formed, and including means for periodically sweeping the electron beam thereof along one coordinate of said screen, and means for deflecting the swept electron beam along another coordinate of said screen; light amplifier means including an image receiving portion and an image reproducing portion, said amplifier means being one of the type in which an image projected onto the image receiving portion thereof is amplified thereby, and a continuous image tends to remain on said image reproducing portion; means for projecting an image on said screen onto the image receiving portion of said light amplifier means; and means coupled to said light amplifier means and synchronous with the deflection of the swept electron beam for erasing a discrete portion of the image on said light amplifier means immediately in front of and along the entire extent of the intensified image of the swept electron beam, said discrete portion being a relatively small fraction of the entire area of the image reproducing portion of said light amplifier means.

12. In combination, a cathode ray tube indicator having a screen on which an image may be formed, and including means for periodically sweeping the electron beam thereof along one coordinate of said screen, and means for deflecting the swept electron beam long a second coordinate of said screen; light amplifier means including an image receiving portion and an image reproducing portion, said amplifier means being one of the type in which an image projected onto the image receiving portion thereof is amplified thereby, and a continuous image tends to remain on said image reproducing portion; means for projecting an image on the screen of said indicator onto the image receiving portion of said light amplifier means, said light amplifier means being formed with two conductive layers across which an electric field may be applied, one of said conductive layers comprising a plurality of discrete, elongated sections which are insulated from one another and arranged in side-by-side relation, said light amplifier means being arranged relative to the screen of said indicator so that the projected image of the swept electron beam is parallel to said elongated strips; a connection to a source of potential to which all of said sections except one are normally connected; and means synchronous with the deflection of the swept electron beam for disconnecting successive ones of said elongated sections from said connection for erasing a discrete portion of the image on said light amplifier means immediately in front of and along the entire extent of the intensified image of the swept electron beam.

13. In combination, a screen on which an image may be formed; light amplifier means including an image receiving portion and an image reproducing portion, said amplifier means being one of the type in which an image projected onto the image receiving portion thereof is amplified thereby, and a continuous image tends to remain on said image reproducing portion, said light amplifier means being formed with two conductive layers across which an electric field may be applied, one of said conductive layers comprising a plurality of discrete sections which are insulated from one another; means for projecting an image on the screen of said indicator onto the image receiving portion of said light amplifier means; two connections for a source of potential, one connected to all of said sections except one, and the other permanaently connected to said other conductive layer; and means for changing the one of said sections disconnected from said connection.

14. A light amplifier comprising a laminated structure including an image receiving portion adapted to receive a radiant energy image, and an image reproducing portion, said amplifier being one of the type in which an image received on the image receiving portion thereof is amplified by the light amplifier, and a continuous image tends to remain on said image reproducing portion, said light amplifier being formed with two conductive layers across which an electric field may be applied, one of said conductive layers comprising a plurality of discrete sections which are insulated from one another; a pair of connections for a source of energizing voltage, one connected to all of said sections except the one or ones adjacent to the section of the laminated structure it is desired to blank, and the other connected to the other conductive layer; and means for changing the one or ones of said sections which are disconnected from said connection.

15. A light amplifier as set forth in claim 14, wherein there are at least one hundred of said insulated sections, each said section comprising a longitudinal strip, and said strips being arranged in side-by-side relation.

16. A light amplifier as set forth in claim 14, wherein said sections extend radially from the center of said one conductive layer to the outer edge of said layer.

17. A regenerative type light amplifier comprising a laminated structure including an image receiving portion adapted to receive a radiant energy image, and an image reproducing portion, said amplifier being one of the type in which an image received on the image receiving portion thereof is amplified by the light amplifier, and a continuous image tends to remain on said image reproducing portion, said light amplifier being formed with two conductive layers across which an electric field may be applied, one of said conductive layers comprising a plurality of discrete sections which are insulated from one another; a pair of connections for a source of energizing voltage, one connected to all of said sections except the one or ones adjacent to the section of the laminated structure it is desired to blank, and the other connected to the other conductive layer; and means for changing the one or ones of said sections which are disconnected from said connection in accordance with the sections of the laminated structure it is desired to blank.

18. A light amplifier comprising a laminated structure including an image receiving portion adapted to receive a radiant energy image, and an image reproducing portion, said amplifier being one of the type in which an image received on the image receiving portion thereof is amplified by the light amplifier, and a continuous image tends to remain on said image reproducing portion, said light amplifier being formed with two conductive layers across which an electric field may be applied, one of said conductive layers comprising a plurality of discrete sections which are insulated from one another; a pair of connections for a source of energizing voltage, means for applying voltage from said pair of connections across said two conductive layers, said last means including switching means for sequentially reducing the voltage across one of said conductive layers and successive sections of the other conductive layer for progressively erasing discrete portions of said image.

References Cited in the file of this patent

UNITED STATES PATENTS

| 2,649,581 | Tasker | Aug. 18, 1953 |
| 2,653,312 | Haworth | Sept. 22, 1953 |
| 2,668,286 | White | Feb. 2, 1954 |
| 2,698,915 | Piper | Jan. 4, 1955 |
| 2,718,609 | Covely | Sept. 20, 1955 |
| 2,728,815 | Kalfaian | Dec. 27, 1955 |

FOREIGN PATENTS

| 157,101 | Australia | Feb. 19, 1953 |

OTHER REFERENCES

Bramley: Review of Scientific Instruments, June 1953, volume 24, pages 471 and 472.